(12) United States Patent
Hung et al.

(10) Patent No.: US 11,527,936 B2
(45) Date of Patent: Dec. 13, 2022

(54) HEAT-DISSIPATION FRAME ASSEMBLY

(71) Applicant: TECO Electric & Machinery Co., Ltd., Taipei (TW)

(72) Inventors: Lian-Shin Hung, Taipei (TW); Ming-Te Ho, Taipei (TW); Pi-Jen Hsieh, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 215 days.

(21) Appl. No.: 16/889,207

(22) Filed: Jun. 1, 2020

(65) Prior Publication Data
US 2021/0257877 A1  Aug. 19, 2021

(30) Foreign Application Priority Data

Feb. 13, 2020 (TW) .................. 109201547

(51) Int. Cl.
| | |
|---|---|
| *H02K 5/18* | (2006.01) |
| *H02K 9/04* | (2006.01) |
| *H02K 5/20* | (2006.01) |

(52) U.S. Cl.
CPC .............. *H02K 5/18* (2013.01); *H02K 5/20* (2013.01); *H02K 9/04* (2013.01)

(58) Field of Classification Search
CPC ............ H02K 5/18; H02K 5/20; H02K 5/203; H02K 5/207; H02K 9/04; H02K 9/06; H02K 5/04
See application file for complete search history.

(56) References Cited

U.S. PATENT DOCUMENTS

| | | | | |
|---|---|---|---|---|
| 5,698,913 | A * | 12/1997 | Yagi ..................... | B61C 9/46 310/58 |
| 2014/0312722 | A1 * | 10/2014 | Raad ................... | H02K 11/042 310/67 R |
| 2017/0279337 | A1 * | 9/2017 | Komura .............. | H02K 5/18 |
| 2019/0386537 | A1 * | 12/2019 | Dib .................... | H02K 5/18 |

FOREIGN PATENT DOCUMENTS

DE      102007034913 A1 *  2/2009  ............ H02K 11/33

OTHER PUBLICATIONS

Machine Translation of DE 102007034913 A1 (Year: 2007).*

* cited by examiner

*Primary Examiner* — Quyen P Leung
*Assistant Examiner* — Christopher S Leone
(74) *Attorney, Agent, or Firm* — Muncy, Geissler, Olds & Lowe, P.C.

(57) ABSTRACT

A heat-dissipation frame assembly includes a motor frame, an air-guide shield and an airflow-driving device. The motor frame includes a main frame and annular heat-dissipation fins. Each of the annular heat-dissipation fins has an outer edge, and an average radial distance is defined between the outer edge and the central axis. The average radial distances of the annular heat-dissipation fins are decreased gradually in the longitudinal direction from the first end portion to the second end portion, and an external annular channel is formed between any neighboring two annular heat-dissipation fins. The airflow-driving device, disposed at the second end portion of the main frame, is used for generating at least one heat-dissipating airflow. The air-guide shield, connected with the motor frame, surrounds and covers the plurality of annular heat-dissipation fins, such that the at least one heat-dissipating airflow is guided into the plurality of external annular channels.

4 Claims, 9 Drawing Sheets

HEAT-DISSIPATION FRAME ASSEMBLY

This application claims the benefit of Taiwan Patent Application Serial No. 109201547, filed Feb. 13, 2020, the subject matter of which is incorporated herein by reference.

BACKGROUND OF THE INVENTION

(1) Field of the Invention

The invention relates to an assembly, and more particularly to a heat-dissipation frame assembly.

(2) Description of the Prior Art

Motor, or electric motor, is an electric device that transfers electric energy into kinetic energy for driving other appliances. Nowadays, the motor has been widely applied in versatile fields. Operation of the motor is largely similar to that of the generator, and the major difference in between is at different directions of energy transformation.

Generally, the motor includes a rotor structure, a stator structure and a motor frame. In particular, the rotor structure and the stator structure are integrated structurally to form a core motor assembly, disposed in an accommodation space defined by the motor frame. If too much heat is generated while in operating the motor, possible thermal damages thereto could be induced.

Thus, in order to dissipate the heat generated by the rotor structure, a plurality of heat-dissipation fins are furnished onto an outer circumferential surface of the motor frame. Preferably, at least one airflow-driving device can be provided to help dissipating excessive heat.

Refer to FIG. 1 and FIG. 2; where FIG. 1 is a schematic perspective view of a conventional heat-dissipation frame assembly, and FIG. 2 is a schematic cross-sectional view of FIG. 1 along line A-A. As shown, a heat-dissipation frame assembly PA100, used to accommodate a core motor assembly (not shown in the figure), includes a motor frame PA1 and two airflow-driving devices PA2, PA2a.

The motor frame PA1 includes a main frame PA11 and a plurality of annular heat-dissipation fins PA12 (only one labeled in the figure). The main frame PA11 shaped as a tube structure, provides an accommodation space PAS to contain thereinside the core motor assembly. The plurality of annular heat-dissipation fins PA12, provided with a predetermined interval, are disposed on the outer circumferential surface of the main frame PA11 in a surrounding and protrusive manner. As shown, an external annular channel is formed between every two neighboring annular heat-dissipation fins PA12, and thus a plurality of annular heat-dissipation fins PA12 would form a plurality of external annular channels.

The two airflow-driving devices PA2 and PA2a, connected together, are mounted fixedly to the annular heat-dissipation fins PA12 or/and the main frame PA11, so that heat-dissipating airflows PAF would be induced along the corresponding external annular channels. Especially, since the two airflow-driving devices PA2 and PA2a are disposed at the same side of the motor frame PA1, so after the heat-dissipating airflows PAF flow into the corresponding external annular channels, the heat-dissipating airflows PAF can't flow smoothly along the individual external annular channels to another side of the motor frame PAL Practically, each of the heat-dissipating airflows PAF would flow along a leading portion of the external annular channel, and then separate to be discharged into the atmosphere. Thereupon, the heat to be dissipated, carried by the heat-dissipating airflow PAF, would never reach the farther side of the motor frame PA1 away from the airflow-driving devices PA2 and PA2a.

Then, refer to FIG. 3 and FIG. 4; where FIG. 3 is a schematic perspective view of another conventional heat-dissipation frame assembly, and FIG. 4 is a schematic cross-sectional view of FIG. 3 along line B-B. As shown, a heat-dissipation frame assembly PA100a, used for accommodating a core motor assembly (not shown in the figure), includes a motor frame PA1 and a plurality of airflow-driving devices PA2, PA2a, PA2b, PA2c. The motor frame PA1 includes a main frame PA11 and a plurality of annular heat-dissipation fins PA12. Since both of which are similar to those in FIG. 1, thus details thereabout would be omitted herein. In addition, the airflow-driving devices PA2, PA2a are also resembled to those in FIG. 1. On the other hand, the airflow-driving devices PA2b, PA2c are structurally resembled to the airflow-driving device PA2, PA2a, except for the locations.

Since the airflow-driving devices PA2b, PA2c and the airflow-driving devices PA2, PA2a are disposed to two opposing lateral sides of the motor frame PA1, thus the heat-dissipating airflows PAF generated by the airflow-driving devices PA2, PA2a and the heat-dissipating airflow PAFa generated by the airflow-driving device PA2b, PA2c can dissipate heat individually at opposing lateral sides of the motor frame PA1.

With the aforesaid improvement, though heat at the two opposing lateral sides of the motor frame can be effectively dissipated, yet the number of the airflow-driving devices is twice the previous model shown in FIG. 1, and thus the cost thereof would be also doubled. In addition, the motor frame PA1 has a frame thickness PAW1, and each of the airflow-driving devices PA2, PA2a, PA2b, PA2c has a thickness PAW2. Therefore, in the improvement of the motor frame PA1 having double-side airflow-driving devices, an addition of a PAW2 thickness is inevitable. In view of the modern stream in light-weight and miniaturization, such a motor model does provide too high a CP value (Cost-performance ratio) to meet the mainstream fashion. On the other hand, if the airflow-driving devices are displaced to end portions of the motor frame PA1, the induced heat-dissipating airflow would be blocked by the annular heat-dissipation fins PA12, and thus less heat-dissipating airflow can be introduced to flow through the external annular channels. Hence, a further improvement upon the conventional heat-dissipation frame assembly is definitely necessary.

SUMMARY OF THE INVENTION

In view that the conventional heat-dissipation frame assembly having an irreducible cost and an additional thickness cannot meet the mainstream design, accordingly it is an object of the present invention to provide a heat-dissipation frame assembly that can resolve at least one of the shortcomings in the art.

In the present invention, the heat-dissipation frame assembly, applied for accommodating a core motor assembly, includes a motor frame, an airflow-driving device and an air-guide shield.

The motor frame includes a main frame and a plurality of annular heat-dissipation fins. The main frame, extending from a first end portion to a second end portion in a longitudinal direction parallel to a central axis thereof, is formed as a tube structure having an inner circumferential surface and an outer circumferential surface. The inner circumferential surface defines an accommodation space for accommodating thereinside the core motor assembly. The plurality of annular heat-dissipation fins, spaced from each other in the longitudinal direction, protrude individually from the outer circumferential surface in a surrounding manner Each of the plurality of annular heat-dissipation fins has an outer edge, and an average radial distance is defined between the outer edge and the central axis. The average radial distances of the plurality of annular heat-dissipation fins are decreased gradually in the longitudinal direction from the first end portion to the second end portion, and an external annular channel is formed between any neighboring two of the plurality of annular heat-dissipation fins, such that a plurality of the external annular channels are disposed on and surrounds the outer circumferential surface by being separated to each other. The airflow-driving device, disposed at the second end portion, is used for generating at least one heat-dissipating airflow. The air-guide shield, connected with the motor frame, surrounds and covers the plurality of annular heat-dissipation fins, such that the at least one heat-dissipating airflow is guided into the plurality of external annular channels.

In one embodiment of the present invention, the motor frame has a first side, a top side and a second side opposite to the first side, and the air-guide shield surrounds and covers the top side.

In one embodiment of the present invention, the air-guide shield surrounds and covers at least a portion of the first side and at least a portion of the second side.

In one embodiment of the present invention, an average thickness is defined between the outer circumferential surface and the inner circumferential surface, and the average thicknesses are gradually decreased in the longitudinal direction from the first end portion to the second end portion.

In one embodiment of the present invention, a structural thickness is defined between the outer circumferential surface and the inner circumferential surface, and the structural thicknesses in a first direction perpendicular to the central axis are gradually decreased in the longitudinal direction from the first end portion to the second end portion, such that the average thicknesses are gradually decreased in the longitudinal direction from the first end portion to the second end portion.

In one embodiment of the present invention, in a second direction perpendicular to the central axis and different to the first direction, the structural thicknesses in the longitudinal direction from the first end portion to the second end portion are the same.

In one embodiment of the present invention, the plurality of annular heat-dissipation fins are perpendicular to the central axis.

In another aspect of the present invention, a heat-dissipation frame assembly is applied for accommodating a core motor assembly including an airflow-driving device, and the airflow-driving device is used for generating at least one heat-dissipating airflow. The heat-dissipation frame assembly includes a motor frame and an air-guide shield.

The motor frame includes a main frame and a plurality of annular heat-dissipation fins. The main frame, extending from a first end portion to a second end portion in a longitudinal direction parallel to a central axis thereof, is formed as a tube structure having an inner circumferential surface and an outer circumferential surface. The inner circumferential surface defines an accommodation space for accommodating thereinside the core motor assembly. The plurality of annular heat-dissipation fins, spaced from each other in the longitudinal direction, protrude individually from the outer circumferential surface in a surrounding manner Each of the plurality of annular heat-dissipation fins has an outer edge, and an average radial distance is defined between the outer edge and the central axis. The average radial distances of the plurality of annular heat-dissipation fins are decreased gradually in the longitudinal direction from the first end portion to the second end portion, and an external annular channel is formed between any neighboring two of the plurality of annular heat-dissipation fins, such that a plurality of the external annular channels are disposed on and surrounds the outer circumferential surface by being separated to each other. The air-guide shield, connected with the motor frame, surrounds and covers the plurality of annular heat-dissipation fins, such that the at least one heat-dissipating airflow is guided into the plurality of external annular channels. The airflow-driving device of the core motor assembly is disposed at the second end portion.

In one embodiment of the present invention, an average thickness is defined between the outer circumferential surface and the inner circumferential surface, and the average thicknesses are gradually decreased in the longitudinal direction from the first end portion to the second end portion.

In one embodiment of the present invention, a structural thickness is defined between the outer circumferential surface and the inner circumferential surface, and the structural thicknesses in a first direction perpendicular to the central axis are gradually decreased in the longitudinal direction from the first end portion to the second end portion, such that the average thicknesses are gradually decreased in the longitudinal direction from the first end portion to the second end portion.

As stated above, the heat-dissipation frame assembly provided by the present invention can apply the air-guide shield to guide the heat-dissipating airflow generated by the airflow-driving device at the second end portion into the external annular channels formed by the annular heat-dissipation fins, such that the heat-dissipating fins can be prevented from being blocked by the annular heat-dissipation fins. Thereupon, besides the annular heat-dissipation fins can provide the waterproof performance, the heat-dissipation fins can also utilize the air-guide shield to lead the heat-dissipating airflow into the external annular channels, so that advantage in heat dissipation can be obtained.

All these objects are achieved by the heat-dissipation frame assembly described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a heat-dissipation frame assembly. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
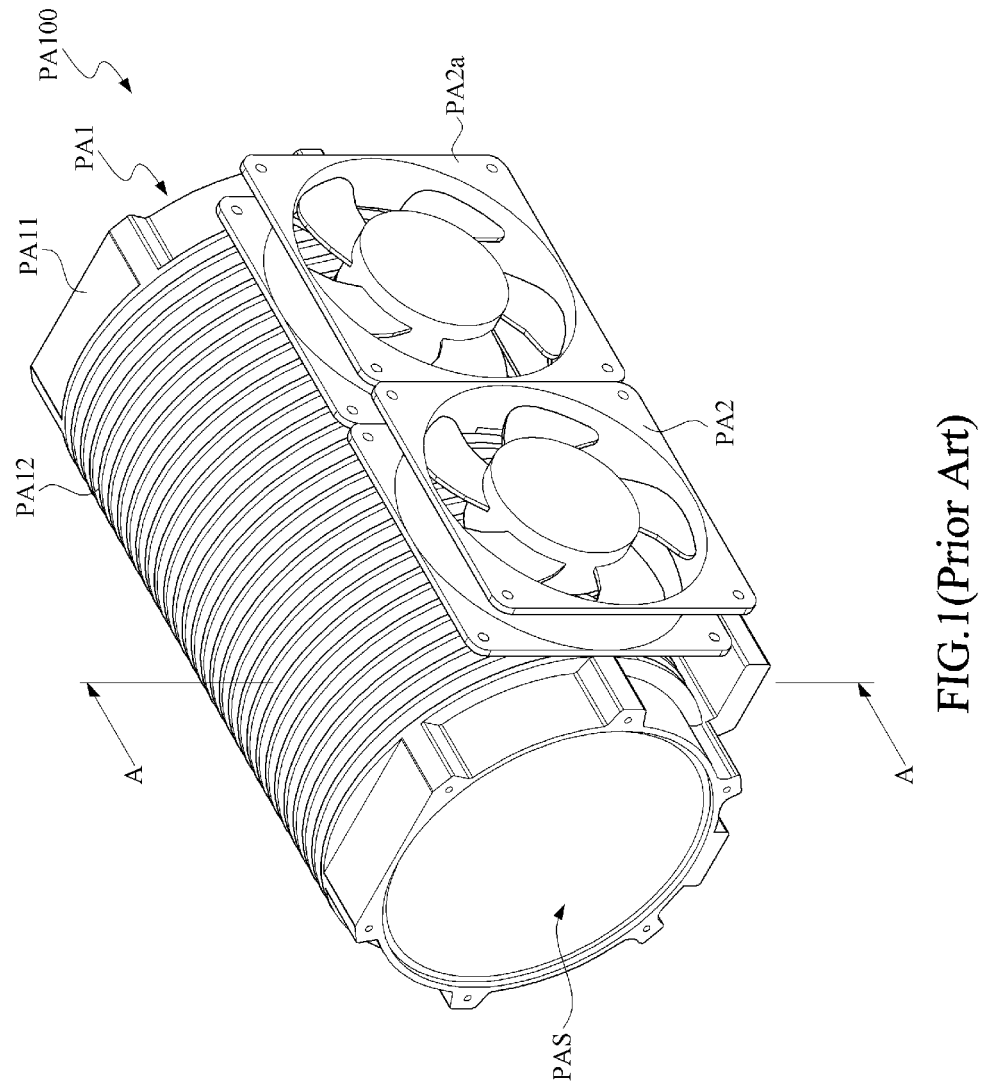
FIG. 1 is a schematic perspective view of a conventional heat-dissipation frame assembly.
Figure 2:
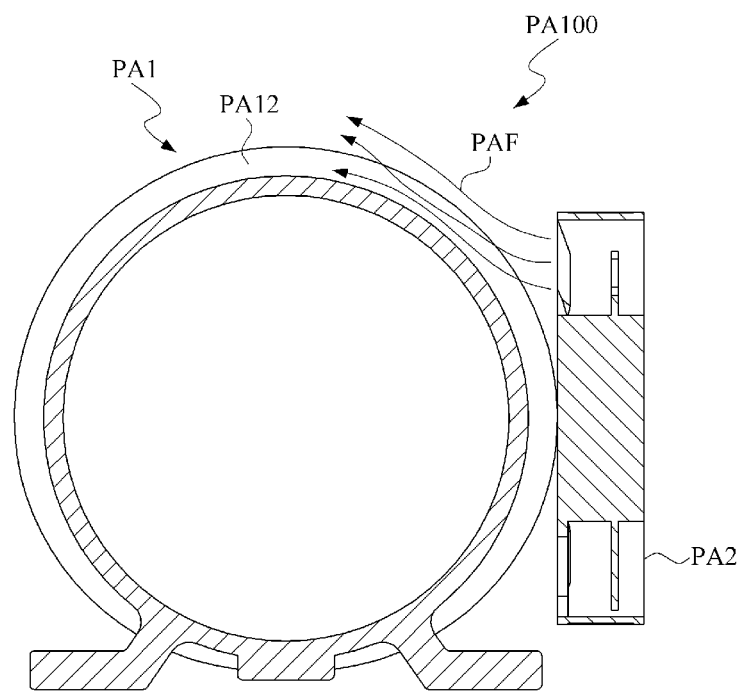
FIG. 2 is a schematic cross-sectional view of FIG. 1 along line A-A.
Figure 3:
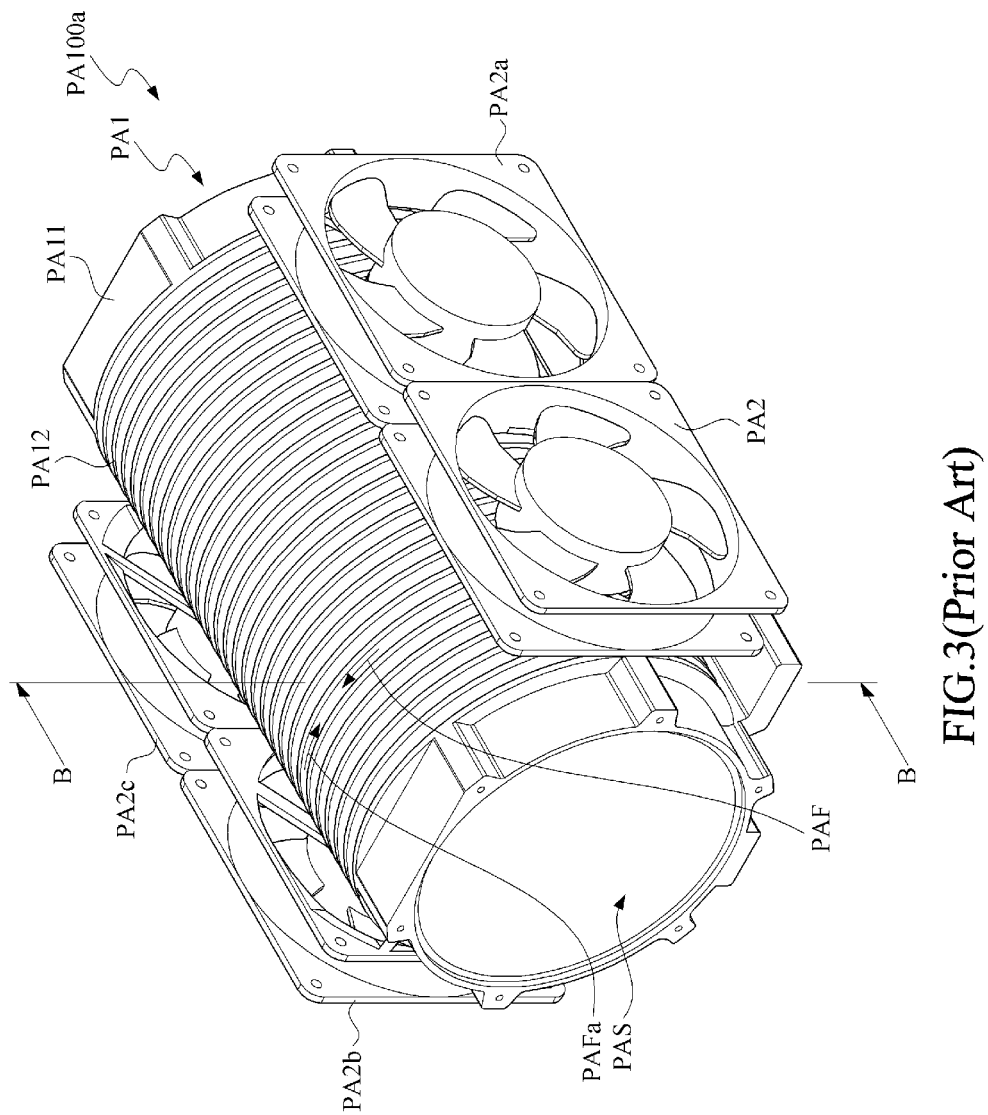
FIG. 3 is a schematic perspective view of another conventional heat-dissipation frame assembly.
Figure 4:
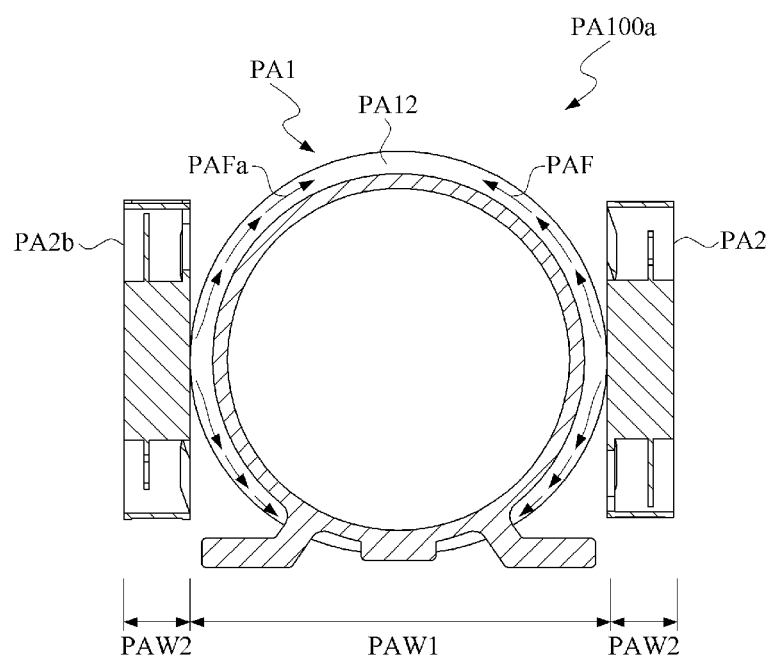
FIG. 4 is a schematic cross-sectional view of FIG. 3 along line B-B.
Figure 5:
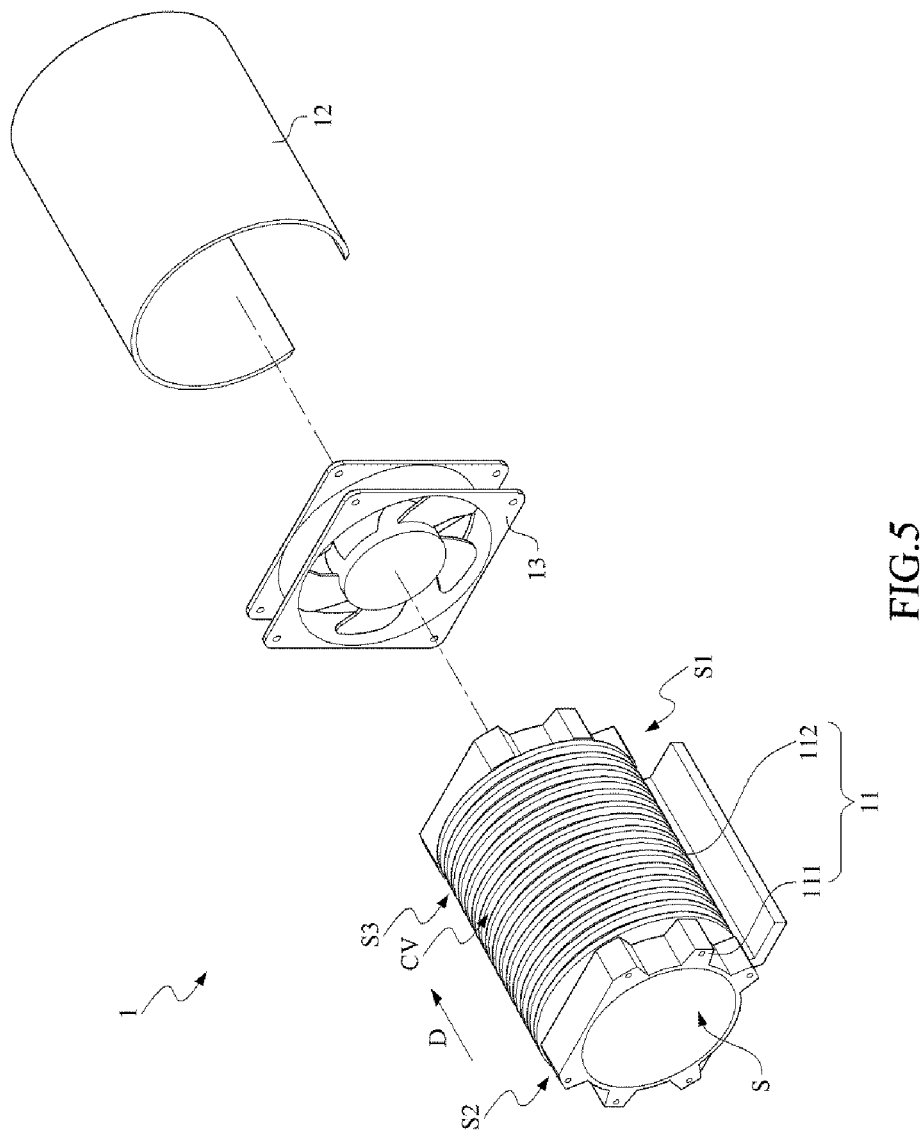
FIG. 5 is a schematic exploded view of a first embodiment of the heat-dissipation frame assembly in accordance with the present invention.
Figure 6:
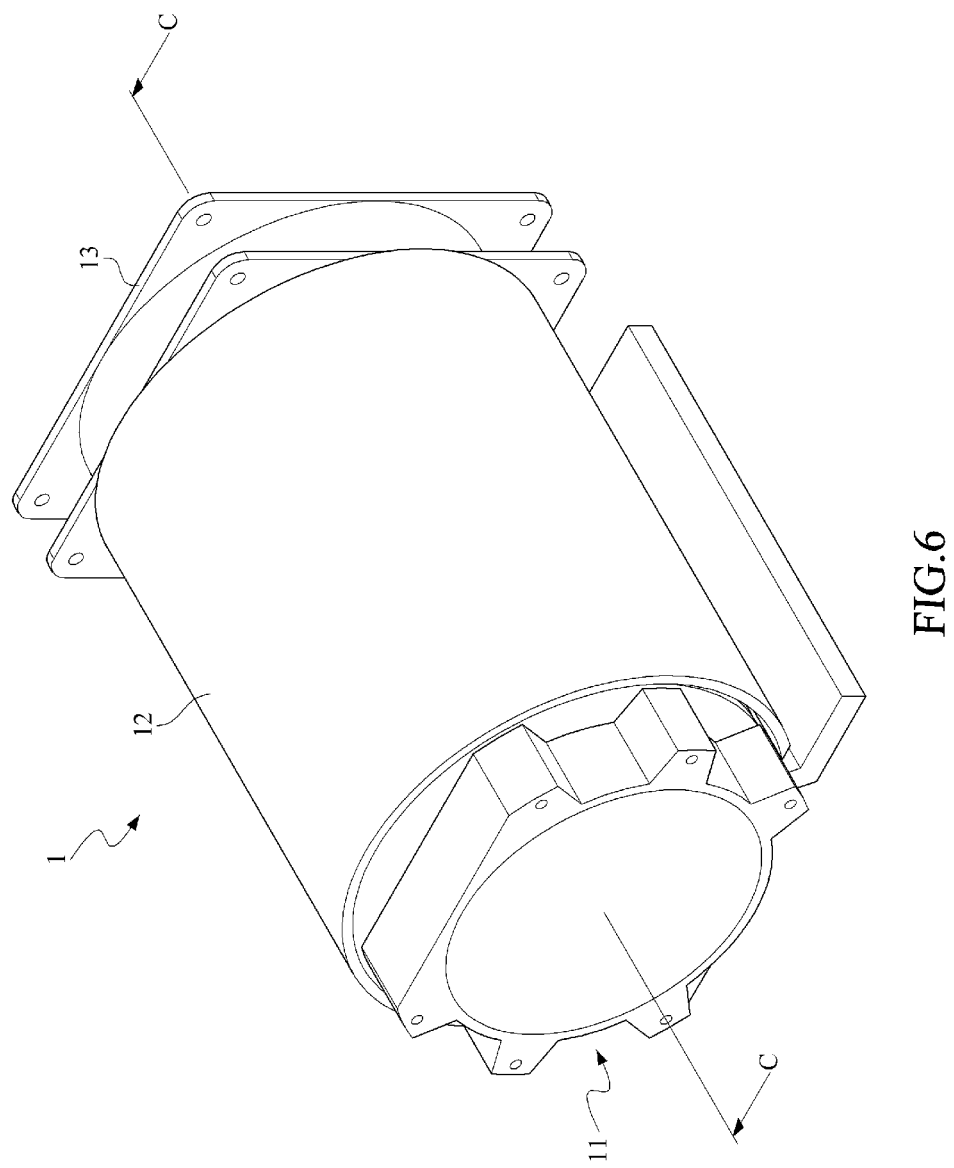
FIG. 6 is a schematic perspective view of FIG. 5.
Figure 7:
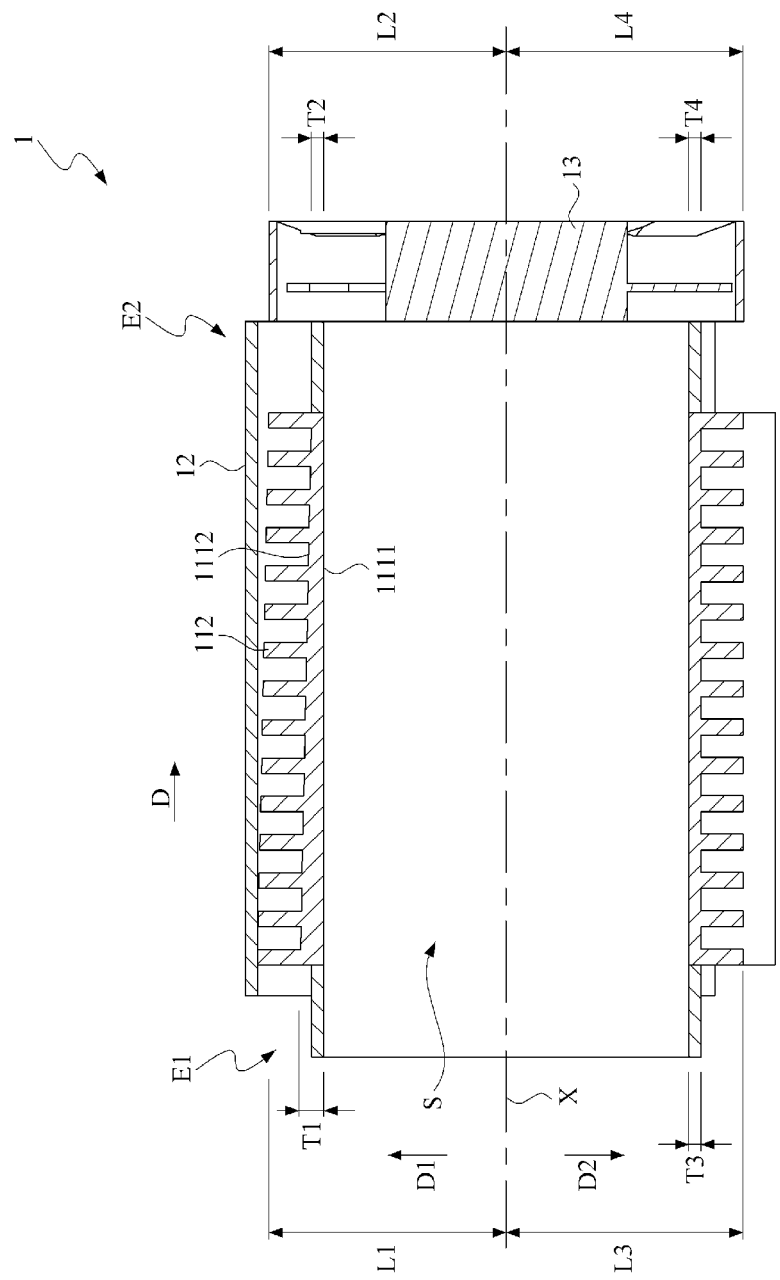
FIG. 7 is a schematic cross-sectional view of FIG. 6 along line C-C.
Figure 8:
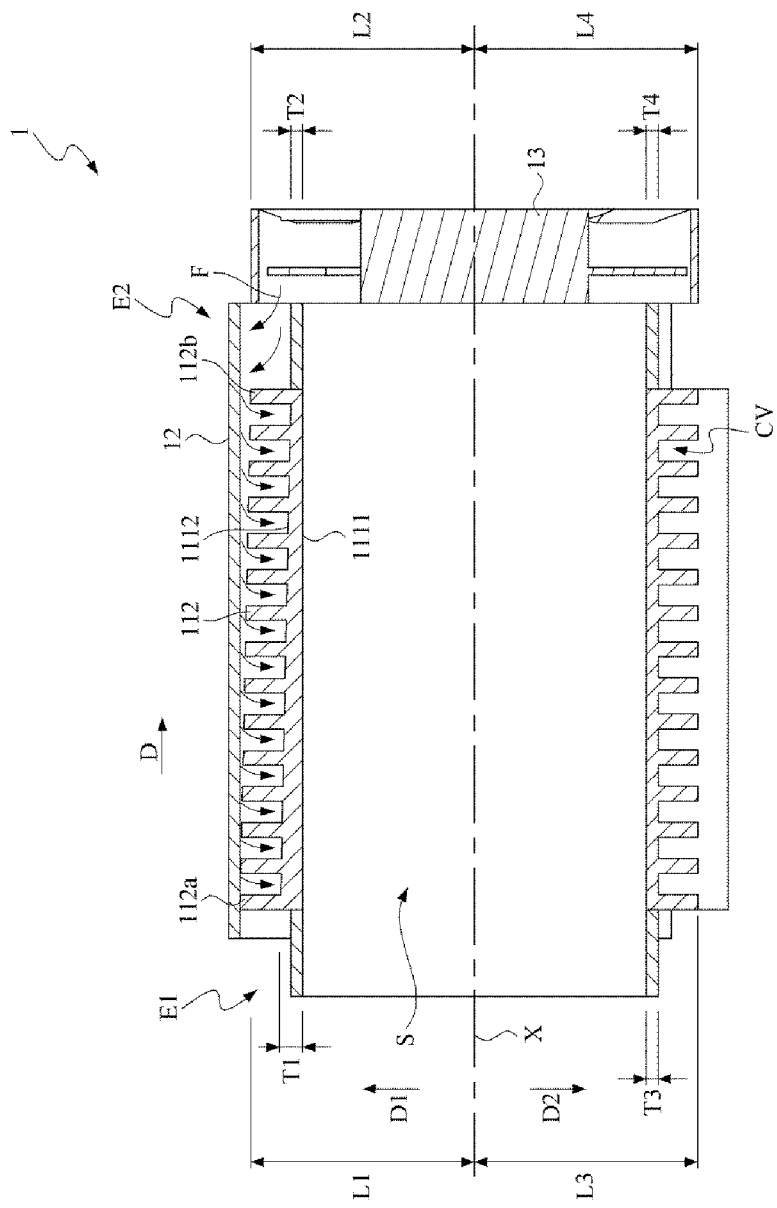
FIG. 8 demonstrates schematically a flow field of FIG. 7.

Refer to FIG. 5 through FIG. 8; where FIG. 5 is a schematic exploded view of a first embodiment of the heat-dissipation frame assembly in accordance with the present invention, FIG. 6 is a schematic perspective view of FIG. 5, FIG. 7 is a schematic cross-sectional view of FIG. 6 along line C-C, and FIG. 8 demonstrates schematically a flow field of FIG. 7. As shown, the heat-dissipation frame assembly 1, applied to accommodate a core motor assembly, includes a motor frame 11, an air-guide shield 12 and an airflow-driving device 13. Generally speaking, the core motor assembly includes at least a rotor assembly and a stator assembly.

The motor frame 11 includes a main frame 111 and a plurality of annular heat-dissipation fins 112 (one labeled in the figure). The main frame 111, extending from a first end portion E1 thereof to a second end portion E2 in a longitudinal direction D parallel to a central axis X, is formed as a tube structure having an inner circumferential surface 1111 and an outer circumferential surface 1112. The inner circumferential surface 1111 is provided to define an accommodation space S for containing the core motor assembly. The average thicknesses between the outer circumferential surface 1112 and the inner circumferential surface 1111 are gradually decreased in the longitudinal direction D from the first end portion E1 to the second end portion E2. It shall be explained that the average thickness stands for an average of radial thicknesses at the same cross section of the main frame 111 between the outer circumferential surface 1112 and the inner circumferential surface 1111, which can be calculated by averaging the area integral of the instant cross section.

The annular heat-dissipation fins 112, spaced from each other by an interval, protrude individually and radially outward from the outer circumferential surface 1112 (i.e., back against the inner circumferential surface 1111). Any neighboring two of the annular heat-dissipation fins 112 is structurally spaced by an external annular channel CV, such that a plurality of parallel external annular channels CV can be formed to surround the outer circumferential surface 1112. Thereupon, with this structuring of the annular heat-dissipation fins 112, any liquid dropped onto the outer circumferential surface 1112 would flow smoothly downward along the outer circumferential surface 1112, such that a waterproof motor frame 111 can be thus obtained. Each of the annular heat-dissipation fins 112 is defined with an average radial distance between a corresponding outer edge and the central axis X of the motor frame 111, and the average radial distance of the corresponding annular heat-dissipation fin 112 would vary in a descending manner and in the longitudinal direction D from the first end portion E1 to the second end portion E2. The average radial distance stands for an average of radial thicknesses at the same cross section of the same annular heat-dissipation fin 112 from the corresponding outer edge to the central axis X, which can be calculated by averaging the radial-distance integral of the outer edges on the instant cross section.

The airflow-driving device 13, disposed at the second end portion E2, is used for generating at least one heat-dissipating airflow F. The air-guide shield 12, shielding the motor frame 11 by surrounding and covering the annular heat-dissipation fins 112, is used for guiding the heat-dissipating airflow F to flow through the external annular channels CV. In this embodiment, the motor frame 11 has a first side S1, a second side S2 and a top side S3; and, the air-guide shield 12 surrounds and covers the top side S3, at least a portion of the first side S1, and at least a portion of the second side S2. In some other embodiments according to this invention, the air-guide shield 12 may only surround and cover the top side S3 so as to ensure that the heat-dissipating airflow F can be forced into the external annular channels CV from the top side S3. In addition, in comparison with the conventional design, with the airflow-driving device 13 to be disposed at the second end portion E2 in this embodiment, the entire width of the motor can be reduced.

Further, in this embodiment, a first direction D1 and a second direction D2 are individually defined to be perpendicular to the longitudinal direction D of the central axis X.

In the first direction D1, the structural thicknesses between the outer circumferential surface 1112 and the inner circumferential surface 1111 are decreased gradually in the longitudinal direction D from the first end portion E1 to the second end portion E2. As shown, a structural thickness T1 is defined to stand for the structural thickness of the first end portion E1 between the outer circumferential surface 1112 and the inner circumferential surface 1111, and another structural thickness T2 is defined to stand for the structural thickness of the second end portion E2 between the outer circumferential surface 1112 and the inner circumferential surface 1111, in which T1 is greater than T2. Thereupon, the criterion that the average thicknesses are decreased gradually in the longitudinal direction D from the first end portion E1 to the second end portion E2 can be fulfilled. In this embodiment, a ratio between the structural thickness T1 and the structural thickness T2 is about 7:5. In addition, a radial distance L1 is defined as a distance from an outer edge of the annular heat-dissipation fin 112a to the central axis X, and another radial distance L2 is defined as a distance from another outer edge of the annular heat-dissipation fin 112b to the central axis X, in which the radial distance L1 is greater than the radial distance L2; such that the average radial distances of the annular heat-dissipation fins 112 can be decreased gradually in the longitudinal direction D from the first end portion E1 to the second end portion E2.

In the second direction D2, the structural thickness between the outer circumferential surface 1112 and the inner circumferential surface 1111 is constant. As shown, a structural thickness T3 is defined to stand for the structural thickness of the first end portion E1 between the outer circumferential surface 1112 and the inner circumferential surface 1111, and another structural thickness T4 is defined to stand for the structural thickness of the second end portion E2 between the outer circumferential surface 1112 and the inner circumferential surface 1111, in which T3 is equal to T4. Thereupon, the motor frame 11 is formed as a horn shape. In some other embodiments of the present invention, the structural thicknesses in the second direction D2 can be also decreased gradually in the longitudinal direction from the first end portion E1 to the second end portion E2. In addition, a radial distance L3 is defined as a distance from an outer edge of the corresponding annular heat-dissipation fin 112a to the central axis X, and another radial distance L4 is defined as a distance from another outer edge of the corresponding annular heat-dissipation fin 112b to the central axis X, in which the radial distance L3 is equal to the radial distance L4.

Practically, the second direction D2 can be defined close to a mounting side of the motor base frame, and thus the same radial distance for all the annular heat-dissipation fins 112 in the second direction D2 would facilitate the mounting of the motor base frame.

Since the annular heat-dissipation fins 112 and the average radial distances along the central axis X are both decreased gradually from the first end portion E1 to the second end portion E2, thus, in the longitudinal direction D, the annular heat-dissipation fins 112a at the first end portion E1 won't be completely shielded by the annular heat-dissipation fins 112b at the second end portion E2, and thereby the heat-dissipating airflows F can go through the annular heat-dissipation fins 112b.

Further, the heat-dissipating airflows F would be restrained by the air-guide shield 12 so as to be directed into the corresponding external annular channels CV. Namely, the heat-dissipating airflows F inside the air-guide shield 12 would never flow directly into the atmosphere. In this embodiment, the heat-dissipating airflow F would hit the air-guide shield 12, and then be forced to flow into the corresponding external annular channel CV formed between two neighboring annular heat-dissipation fins 112. Hence, according to the present invention, besides the waterproof property of the annular heat-dissipation fins 112 can be maintained, the heat-dissipating airflows F generated by the airflow-driving device 13 at the second end portion E2 can be ensured to flow into the corresponding external annular channels CV close to the first end portion E1. Thereupon, a better heat-dissipation performance can be obtained.

Practically, the airflow-driving device 13 according to the present invention can be a centrifugal fan, an axial fan, or any device that can generate a heat-dissipating airflow F to flow to the annular heat-dissipation fins 112. In addition, dimensions of the airflow-driving device 13 is not specifically limited, and those shown in the figures are only raised for easy explaining the instant embodiments of the present invention. In the case that the airflow-driving device 13 is a centrifugal fan, preferably the air-guide shield 12 shall be extended to at least cover part of the airflow-driving device 13, such that the heat-dissipating airflow F can be guided to the annular heat-dissipation fins 112.

Figure 9:
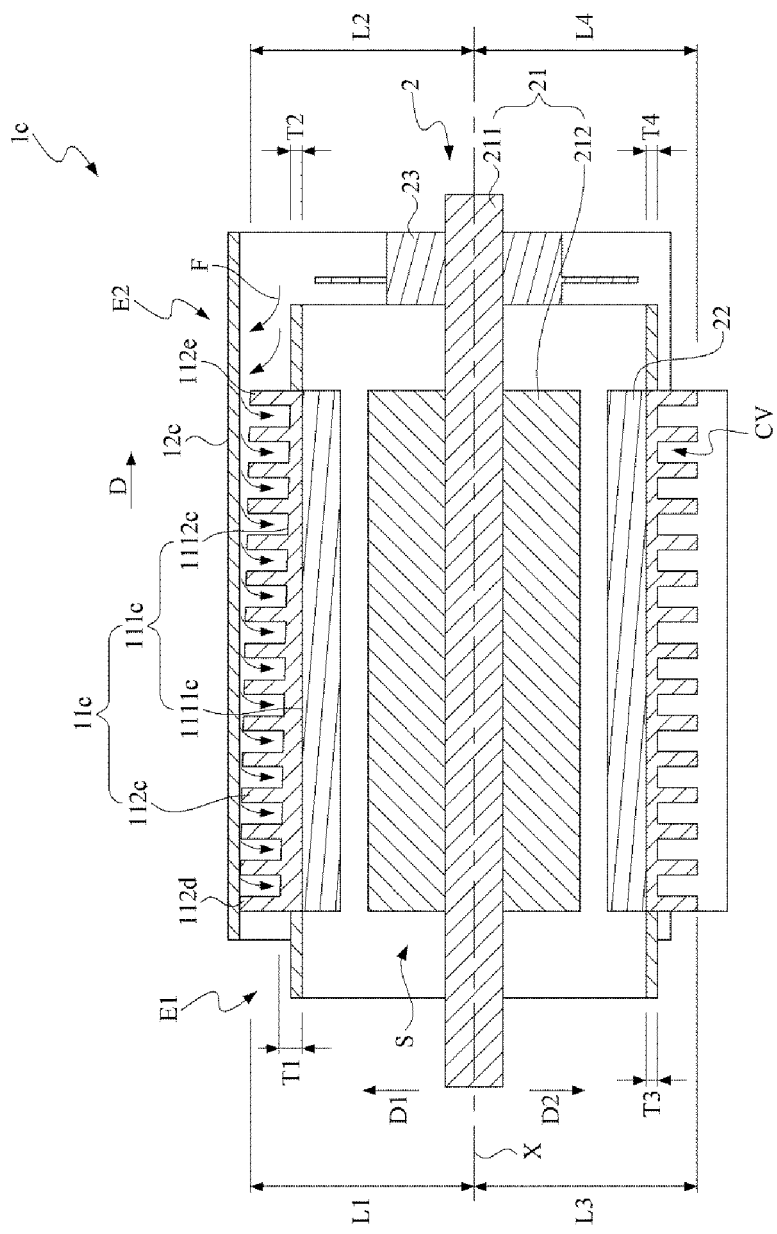
FIG. 9 demonstrates schematically a flow field of a second embodiment of the heat-dissipation frame assembly in accordance with the present invention.

Then, referring to FIG. 9, a flow field of a second embodiment of the heat-dissipation frame assembly in accordance with the present invention is demonstrated schematically. As shown, this heat-dissipation frame assembly 1c, used for accommodating a core motor assembly 2 including an airflow-driving device 23, includes a motor frame 11c and an air-guide shield 12c.

It shall be explained that the heat-dissipation frame assembly 1c of this embodiment is largely resembled to that 1 of the first embodiment. The only difference in between is that the heat-dissipation frame assembly 1c of this embodiment does not include the airflow-driving device 13 of the heat-dissipation frame assembly 1. In other words, in this embodiment, the motor frame 11c, the main frame 111c, the inner circumferential surface 1111c, the outer circumferential surface 1112c, the annular heat-dissipation fins 112c and the air-guide shield 12c are resembled to the respective motor frame 11, main frame 111, inner circumferential surface 1111, outer circumferential surface 1112, annular heat-dissipation fins 112 and air-guide shield 12 of the first embodiment. However, a tailing letter "c" does be assigned to each of the corresponding part numbers of this embodiment. Hence, details about the aforesaid elements are omitted herein. In addition, the annular heat-dissipation fins 112d, 112e of this embodiment are in correspondence to the dissipation fins 112a, 112b of the aforesaid first embodiment.

Generally speaking, the core motor assembly 2 includes at least a rotor assembly 21 and a stator assembly 22. The rotor assembly 21 includes a rotating shaft 211 and a rotor body 212. Part of the core motor assembly 2 further includes an airflow-driving device 23, known as a "built-in fan" in the art.

In this embodiment, the heat-dissipation frame assembly 1c is purposely constructed for mounting the core motor assembly 2 including the airflow-driving device 23. In such a situation, since the core motor assembly 2 itself provides the airflow-driving device 23, so, as the airflow-driving device 23 runs, at least one heat-dissipating airflow F would be generated, and thereby the heat-dissipation frame assembly 1c can be applied to guide the heat-dissipating airflow F. Hence, in this embodiment, the heat-dissipation frame assembly 1c can still provide heat-dissipation capacity if only the motor frame 11c and the air-guide shield 12c are equipped. Also, due to the existence of the annular heat-dissipation fins 112c, the heat-dissipation frame assembly 1c can be still waterproof.

In summary, in comparison with the prior art, the heat-dissipation frame assembly provided by the present invention can apply the air-guide shield and the motor frame with descending average thickness in the longitudinal direction to guide the heat-dissipating airflow to flow from the second end portion to the first end portion, without being blocked by the annular heat-dissipation fins. Thereupon, the annular heat-dissipation fins can be furnished with advantages in both the heat dissipation and the waterproofing. In addition, the heat-dissipation frame assembly of the present invention can be furnished with the airflow-driving device, and also used for accommodating the core motor assembly without the airflow-driving device. Further, the heat-dissipation frame assembly of this invention can also include only the motor frame and the air-guide shield, and is particularly used for accommodating the core motor assembly with the built-in airflow-driving device.

While the present invention has been particularly shown and described with reference to a preferred embodiment, it will be understood by those skilled in the art that various changes in form and detail may be without departing from the spirit and scope of the present invention.

What is claimed is:

1. A heat-dissipation frame assembly, applied for accommodating a core motor assembly, comprising:
   a motor frame, including:
      a main frame, extending from a first end portion to a second end portion in a longitudinal direction parallel to a central axis thereof, formed as a tube structure having an inner circumferential surface and an outer circumferential surface, the inner circumferential surface defining an accommodation space for accommodating thereinside the core motor assembly;
      a plurality of annular heat-dissipation fins, spaced from each other in the longitudinal direction, protruding from the outer circumferential surface in a surrounding manner, wherein each of the plurality of annular heat-dissipation fins has an outer edge and an average radial distance defined between the outer edge and the central axis; wherein the average radial distances of the plurality of annular heat-dissipation fins are decreased gradually in the longitudinal direction from the first end portion to the second end portion, and an external annular channel is formed between any neighboring two of the plurality of annular heat-dissipation fins, such that a plurality of the external annular channels are disposed on and surround the outer circumferential surface by being separated to each other; and an airflow-driving device, disposed at the second end portion, used for generating at least one heat-dissipating airflow; and an air-guide shield, connected with the motor frame, surrounding and covering the plurality of annular heat-dissipation fins, such that the at least one heat-dissipating airflow generated by the airflow-driving device is guided into the plurality of external annular channels from the second end portion to the first end portion;

wherein an average thickness is defined between the outer circumferential surface and the inner circumferential surface at each of the plurality of annular heat-dissipation fins, and the average thicknesses of the plurality of annular heat-dissipation fins are gradually decreased in the longitudinal direction from the first end portion to the second end portion;

wherein a structural thickness is defined between the outer circumferential surface and the inner circumferential surface at each of the plurality of annular heat-dissipation fins, and the structural thicknesses of the plurality of annular heat-dissipation fins in a first direction perpendicular to the central axis are gradually decreased in the longitudinal direction from the first end portion to the second end portion, such that the average thicknesses are gradually decreased in the longitudinal direction from the first end portion to the second end portion;

wherein, in a second direction perpendicular to the central axis and different to the first direction, the structural thicknesses in the longitudinal direction from the first end portion to the second end portion are the same.

2. The heat-dissipation frame assembly of claim 1, wherein the motor frame has a first side, a top side and a second side opposite to the first side, and the air-guide shield surrounds and covers the top side.

3. The heat-dissipation frame assembly of claim 2, wherein the air-guide shield surrounds and covers at least a portion of the first side and at least a portion of the second side.

4. The heat-dissipation frame assembly of claim 1, wherein the plurality of annular heat-dissipation fins are perpendicular to the central axis.

\* \* \* \* \*